(No Model.)
E. WESTON.
SYSTEM FOR THE ELECTRICAL TRANSMISSION OF POWER.
No. 264,981. Patented Sept. 26, 1882.
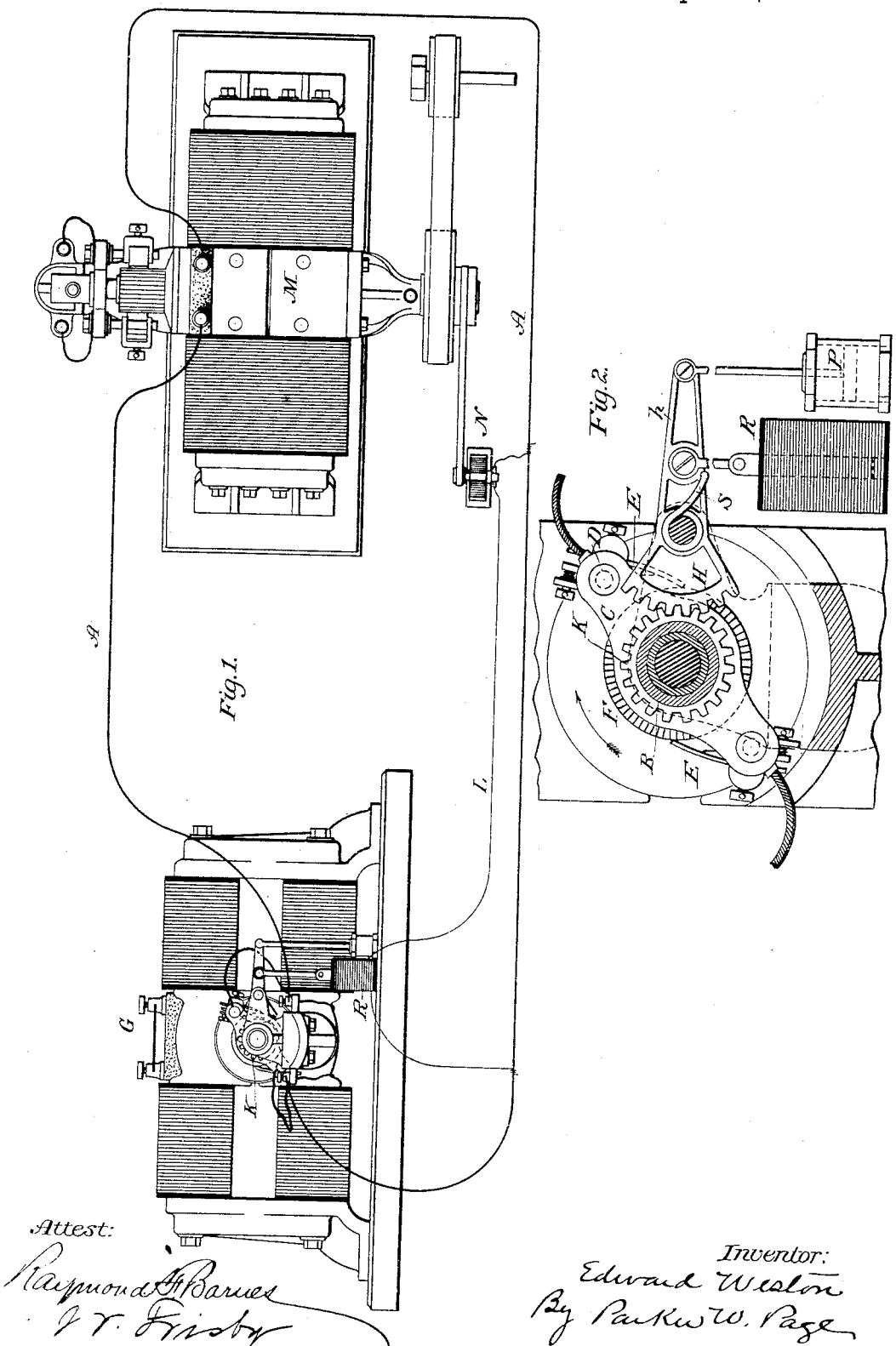
Attest:
Raymond F. Barnes
J. T. Frisby
Inventor:
Edward Weston
By Parker W. Page
atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

SYSTEM FOR THE ELECTRICAL TRANSMISSION OF POWER.

SPECIFICATION forming part of Letters Patent No. 264,981, dated September 26, 1882.

Application filed May 8, 1882. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Systems for the Electrical Transmission of Power, of which the following is a specification, reference being had to the drawings accompanying and forming a part of the same.

In other applications filed by me I have described methods of regulating the amount of power transmitted in an electric circuit containing a generator and a motor by varying the magnetic intensity of the field of the generator through the instrumentality of devices the operation of which was made to depend upon the varying speed of the motor. To this method that embraced by my present application is similar in principle, the distinction being that in the present case the regulation is effected by means of an electro-magnetic apparatus designed for shifting the position of commutator-brushes of the generator.

The nature of the invention will be understood by reference to the accompanying drawings, in which—

Figure 1 is a diagrammatic illustration of the principle of operation of my improvements; and Fig. 2, an end view, on an enlarged scale, of the generator, showing the devices for shifting the commutator-brushes.

The letters A A designate an electric circuit, in which are included a dynamo-electric machine, G, and an electro-magnetic motor, M.

N is a small dynamo-machine, driven by the motor M, and L a wire forming one half the circuit from the said machine back to the generator G, the other half of the circuit being formed by one of the main conductors A.

On the shaft of the machine G is a sleeve, B, carrying a plate, C, in which are set the brush-holders D, insulated by washers of hard rubber in the usual manner. In these holders are clamped brushes E E, which bear upon the commutator F. They may be set to any desired position by turning the holders and plate C.

Attached to and integral with the sleeve B is a gear-wheel, K, with which a segmental gear, H, pivoted on the frame of the machine, engages. The segment H is extended in an arm, $h$, and to this are connected the core of an electro-helix, R, and the piston of a dash-pot, P. The helix R is included in the circuit L of the small machine N.

The action of this apparatus is follows: Normally the brushes should be caused to bear on the commutator at or close to the points of maximum electrical effect, this being accomplished by a weight or a spring, S, connected either to the plate C or to the segment H. When the generator is started, therefore, the motor will have a tendency to run at a high speed. The machine N, being driven by the motor at the same time, develops sufficient current to draw down the core $r$ into the helix R, by which segment H is moved and the position of the brushes E shifted from their normal position to points nearer the center of the magnetic poles, where they take off less current. The dash-pot P prevents oscillation of the parts, so that an equilibrium is quickly established. By loading the motor and reducing its speed the current in helix R is reduced in strength, so that the spring S comes into play, tending to bring the brushes back to their original positions.

The special mechanism by means of which the brush-holders are rotated or the brushes shifted in position may be greatly varied without departure from my invention; and so, too, various forms of electro-magnet may be employed in lieu of that shown.

What I claim as my invention is—

1. The combination, with a main electric circuit, a dynamo-electric machine, and a motor included therein, of a dynamo-machine driven by the motor, a circuit from the same, and mechanism for shifting the brushes of the main generator connected with or operated by said circuit, as described.

2. The combination of a dynamo-electric machine, a rotary brush-holder, and mechanism for shifting the same, with an electro-magnetic motor, a dynamo-machine driven thereby, and an electro-magnet, included in the circuit of said machine, connected with the brush-shifting mechanism, as and for the purpose set forth.

In testimony whereof I have hereunto set my hand this 6th day of May, 1882.

EDWARD WESTON.

Witnesses:
HENRY A. BECKMEYER,
W. FRISBY.